(12) United States Patent
Garnier

(10) Patent No.: US 8,226,445 B2
(45) Date of Patent: Jul. 24, 2012

(54) METHOD OF MANUFACTURING AN ELECTRONIC KEY WITH USB CONNECTOR

(75) Inventor: Laurent Garnier, Moulins (FR)

(73) Assignee: Oberthur Technologies, Paris (FR)

( * ) Notice: Subject to any disclaimer, the term of this patent is extended or adjusted under 35 U.S.C. 154(b) by 0 days.

(21) Appl. No.: 12/240,010

(22) Filed: Sep. 29, 2008

(65) Prior Publication Data

US 2009/0089858 A1 Apr. 2, 2009

(30) Foreign Application Priority Data

Sep. 28, 2007 (FR) ...................................... 07 06841

(51) Int. Cl.
*H01R 24/00* (2006.01)

(52) U.S. Cl. ....................................................... 439/660

(58) Field of Classification Search .................. 439/660, 439/358, 135, 136, 357; 29/825, 876; 361/737; 726/2

See application file for complete search history.

(56) References Cited

U.S. PATENT DOCUMENTS

| | | | | |
|---|---|---|---|---|
| 6,320,753 | B1 * | 11/2001 | Launay .......................... | 361/760 |
| 6,548,888 | B1 * | 4/2003 | Fidalgo et al. ................ | 257/679 |
| D592,143 | S * | 5/2009 | Ho et al. ...................... | D13/147 |
| 2004/0027817 | A1 | 2/2004 | Yen | |
| 2004/0259423 | A1 | 12/2004 | Elbaz et al. | |
| 2007/0289126 | A1 | 12/2007 | Linke et al. | |
| 2008/0090457 | A1 * | 4/2008 | Takeuchi ....................... | 439/607 |

FOREIGN PATENT DOCUMENTS

| | | |
|---|---|---|
| DE | 20200601315 U | 11/2006 |
| EP | 0908844 | 4/1999 |
| FR | 2769389 | 4/1999 |
| FR | 2830107 | 3/2003 |
| WO | WO02103626 | 12/2002 |
| WO | WO2005031639 | 4/2005 |
| WO | WO2006018230 | 2/2006 |
| WO | WO2006027027 | 3/2006 |

OTHER PUBLICATIONS

European Office Action from corresponding application No. EP 08 165 384.2.

* cited by examiner

*Primary Examiner* — Alexamder Gilman

(74) *Attorney, Agent, or Firm* — Lowe Hauptman Ham & Berner, LLP

(57) ABSTRACT

A method of manufacturing an electronic key with USB connector comprises the making of a key body 10, with a polarizer 14 of the connector M, formed in one piece with the key body. The polarizer extends from the surface s1 of the connector which carries the vignette of contact pads, or extending from of the opposite surface s2. The key body excluding the connector, and the polarizer 14 advantageously exhibits the same thickness d1 greater than the standardized thickness dk of the remainder of the connector. It is formed of at least one guidance element 14a. Advantageously it is formed of two guidance elements 14a, one on each side of the vignette, in the form of a longeron following the direction D of introduction of the connector. An outline of the key body is advantageously made in a card body 11, from which it can be separated.

15 Claims, 5 Drawing Sheets

METHOD OF MANUFACTURING AN ELECTRONIC KEY WITH USB CONNECTOR

RELATED APPLICATIONS

The present application is based on, and claims priority from, French Application Number 0706841, filed Sep. 28, 2007, the disclosure of which is hereby incorporated by reference herein in its entirety.

FIELD OF THE INVENTION

The present invention relates to a manufacturing method for making an electronic key with USB connector furnished with a mechanical polarizer and to a corresponding electronic key.

BACKGROUND OF THE INVENTION

The use of USB electronic keys is commonplace, used by electronic devices such as personal computers, mobile telephones, printers, etc. all of which are peripheral ports of these devices. These keys can comprise various functions, including memory, security or other functions.

They must adhere to a standard which defines notably the mechanical and electrical characteristics of the USB interface. A USB key complying with the standard must thus comprise a male connector while the USB peripheral ports of electronic devices must comprise female connectors. Additionally, a USB key comprises a part which is not introduced into the connector and which notably allows it to be gripped. The whole assembly must offer mechanical resistance to torsion and to bending.

The male connector is defined by its dimensions and notably its thickness, the position and the width of the contact pads, and their allocation, which must correspond to the counter-contacts provided in the female connector. An end-on view of a female connector F, with a sectional view of a USB male connector M, is illustrated in FIG. 1. It shows the arrangement 1, 2, 3 and 4 of the counter-contacts cc corresponding respectively to the power supply VDD, to the data link wire D−, to the data link wire D+ and to ground.

When the connector M of the key is introduced, its contact pads pc each come respectively into contact under a corresponding counter-contact cc, held by locking means 5 and 6 provided in the female connector.

In order for connection to take place correctly, the thickness of the male connector must substantially correspond to the standardized space left free between the counter-contacts and the locking means. This standardized thickness $d_K$ is of the order of 2 millimetres.

USB female connectors exhibit the feature of mechanically allowing the insertion of the connector of a key in a correct manner as indicated in FIG. 1, but also in the opposite orientation, that is to say in the example of the figure, contact pads downwards in the figure, which does not allow electrical connection. This feature causes an impediment to the use of these keys. It is thus useful to furnish these electronic keys with a mechanical polarizer.

According to the state of the art, mechanical polarizers such as these are provided in electronic keys which are made from a printed circuit, with the contact pads of the connector at one end, the remainder of the circuit being encapsulated in a protective plastic cover. In these keys, a shielding ring is generally provided, around the connector, which forms a mechanical polarizer: the ring abuts against the frame of the female connector if the connector is introduced wrongly.

However, these keys are expensive to manufacture. Furthermore they leave few possibilities of graphical customization, which is possible only on the cover, and this customization is also expensive.

Other manufacturing techniques have been researched in order to reduce the cost of these keys. Notably, the French patent application published under the number FR 2 830 107 discloses a method of USB key manufacture which uses manufacturing steps borrowed from the well-known techniques for manufacturing chip cards, whose reference standard is the ISO/IEC 7816 standard. These manufacturing techniques comprise the steps of manufacturing the card body, by plastic moulding, or else by laminating thin plastic sheets from commercially available sheets, precutting steps, notably to make the detachable mini-cards in the SIM format, steps of mounting the modules or microcircuits with the contact pads, by machining a cavity and fixing and transferring the module or microcircuit into the cavity so that the pads of the contact of the module are flush with the surface of the card. These various steps are well known to the person skilled in the art.

These manufacturing techniques have been designed to make it possible to produce low-cost chip cards. Furthermore, if at least some steps for manufacturing the key correspond to the techniques for manufacturing these cards, it is possible to manufacture these keys on already existing chip card manufacturing lines—hence an additional reduction in costs. But these keys pose a connectivity problem, on account of the difference in thickness between the chip cards and the USB keys, at least of their USB connector. Specifically it has been seen that the standardized thickness of a USB key (male) connector is of the order of 2 millimetres. A chip card in the ISO format has a standardized thickness of 0.76 millimetres, that is to say less than half as thick. This thickness does not make it possible to achieve correct and reliable contact with the counter-contacts of a USB female connector. To solve this problem, the aforesaid French patent application envisages the use of shims or an adaptor, thereby complicating the manufacture and/or use of the key and increasing its cost. Additionally no mechanical polarizer is envisaged.

SUMMARY OF THE INVENTION

The invention proposes to solve these various technical problems.

According to the invention, a mechanical polarizer is made in one piece with a key body, the polarizer comprising at least one guidance element extending from the surface of the connector which bears the contact pads, or of the opposite surface.

Such as characterized the invention therefore relates to a method of manufacturing an electronic key furnished with a USB standardized connector having a mechanical polarizer, comprising the making of a key body and the placing of contact pads on the surface of the key body to form the connector. The method comprises the formation of the mechanical polarizer in one piece with the key body, in the form of at least one guidance element extending from the surface of the key body bearing the contact pads and/or of the opposite surface.

Advantageously a key body outline is made in a card body manufactured on the basis of customary steps for manufacturing chip cards. They comprise the making of a card body to the standardized ISO 7816 dimensions but thicker, and thicker than the standardized thickness of USB connectors and a key body outline in the card body, so as to make a separable or detachable key body.

Advantageously, a customization of the keys is performed at low cost by the customary techniques for customizing chip cards, so as to customize the card body and/or key body.

A radioemitting antenna can advantageously be integrated into the key body, and connected to the contact pads. When the key is of the microcircuit type comprising an electronic microchip at the back of the contact pads, the tags of the microchip are advantageously connected to the contact pads and to the antenna, allowing communications according to the USB protocol and communications of the contactless proximity type.

The invention also relates to an electronic key, notably a key comprising a key body furnished with a USB connector having a mechanical polarizer, the connector comprising contact pads arranged on the surface of the key body. The mechanical polarizer is formed in one piece with the key body, and comprises at least one guidance element extending from the surface bearing the contact pads, and/or of the opposite surface.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

An electronic key according to the invention comprises a connector polarizer formed in one piece with a key body, the polarizer being extending from the surface of the connector bearing the contact pads, or of the opposite surface.

In the description which follows, the contact pads are advantageously those of a module which furthermore comprises at least one electronic microchip at the back of the contact pads, to which the microchip is connected, by any known technique. Such a module is customarily placed in a cavity formed on the surface of the key body, in a zone of the connector, so that the contact pads are flush with the surface. These insetting techniques are well known. In this context, one speaks of a vignette to designate the contact pads as a whole. This term is used in the subsequent description.

But the invention is not limited to keys comprising such modules. It applies more generally to electronic keys comprising contact pads on the surface of a zone of the connector.

Figure 1:
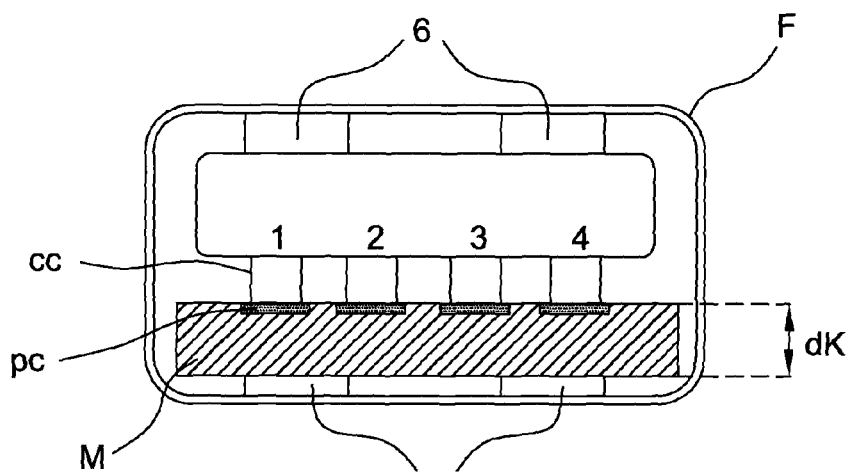
FIG. 1 already described is an end-on sectional view of male and female USB connectors in contact.
Figure 2A:
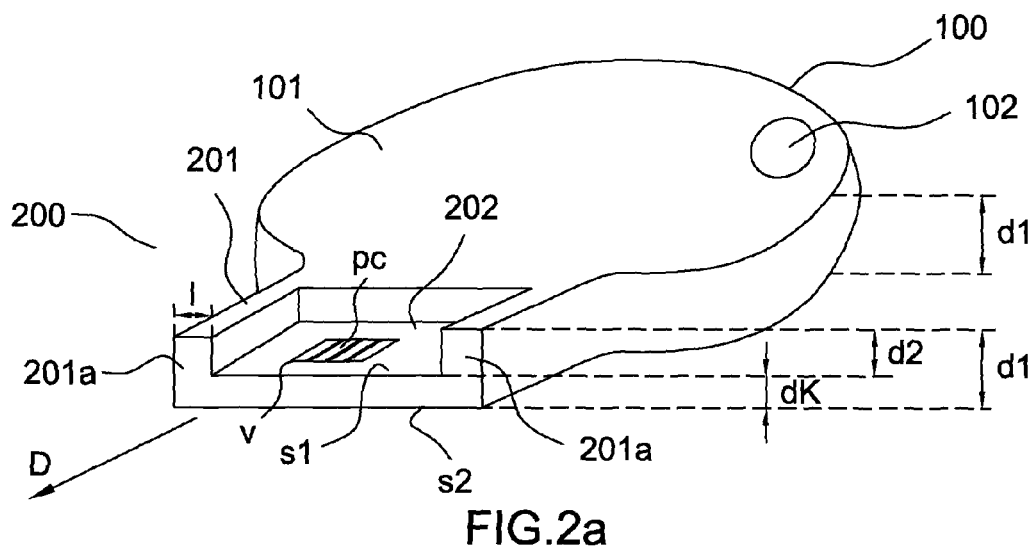
FIGS. 2a and 2b each represent an electronic key with mechanical polarizer of the connector formed in one piece with the key body, according to two implementation examples of the invention.

FIG. 2a illustrates an electronic key 100 according to a first implementation of the invention. It comprises a part 101, allowing it to be gripped, which can be furnished with a hole 102 making it possible to attach it to a key-ring for example, and a connector 200 comprising a vignette v of contact pads pc flush with the surface s1 and a mechanical polarizer 201 extending from this surface s1. The polarizer 201 and the gripping part delimit the part 202 of the connector on the surface s1 of which the vignette is arranged. The assembly comprising the gripping part 101, the polarizer 201 of the connector and the part 202 of the connector that is to receive the vignette is formed in one piece: this is the key body, with a verso face, for example on the vignette side and a recto face. It is a thin object, which in the part 202 with the vignette, has a standardized thickness $d_K$. Outside of this part, the key body has a larger thickness d1. Preferably and as illustrated, the gripping part 101, and the polarizer, preferably have the same thickness d1.

The mechanical polarizer comprises in the example two guidance elements 201a, extending from the surface s1, of a height d2 and a width l. They are arranged one on each side of the vignette v, at the connector rim. They have the form of a longeron or rib, parallel to a direction of introduction D of the connector 200 into a female connector. Viewed end-on and in section, the connector thus has substantially a U form, the branches of the U forming the guidance elements 201a of the polarizer.

Figure 3A:
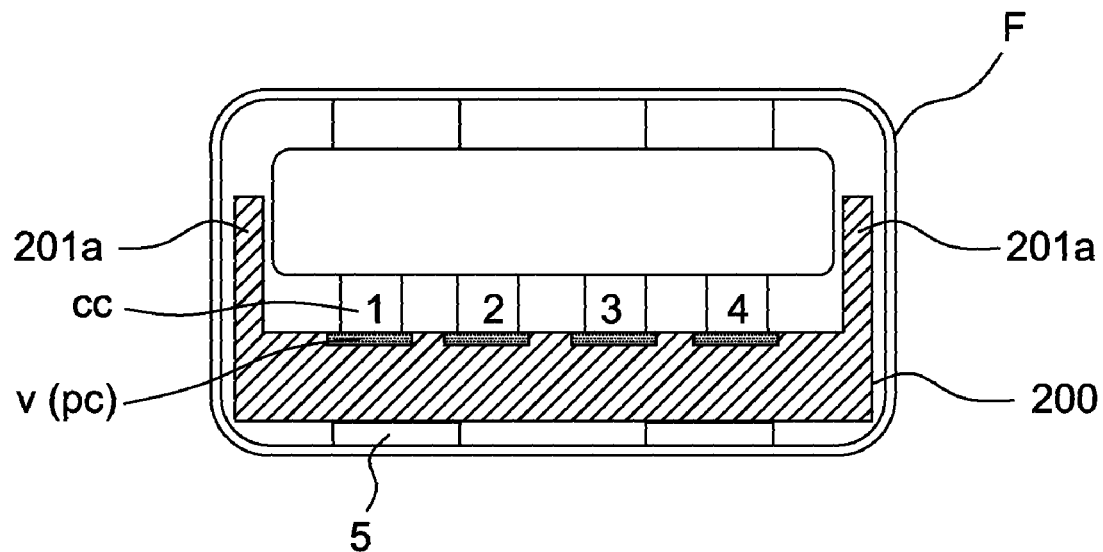
FIGS. 3a and 3b are corresponding and respective end-on sectional views of the USB connector with polarizer introduced into a female connector.

The connector 200 thus formed can be introduced fully into the female connector F, in one orientation only, as illustrated in FIG. 3a. In the opposite orientation (not illustrated), the guidance elements 201a will abut against the frame of the female connector F and prevent its insertion.

We have seen that the standardized thickness $d_K$ is of the order of 2 millimetres. The dimensions (height d2 and width l) of the guidance elements 201a of the polarizer are in practice determined as a function of the reciprocal configuration of the female connector, so as not to impede the insertion of the USB key connector in the permitted orientation, and conversely prevent the insertion in the opposite orientation. These dimensions will advantageously be chosen with d2 lying between 0.5 millimetres and 2.5 millimetres, and l of the order of 0.5 millimetres.

The key body excluding the part 202 of standardized thickness has a thickness d1 that is greater than $d_K$, advantageously of between 2.5 mm and 4.5 mm, ensuring easy gripping, and good mechanical rigidity and strength of the key.

It will be noted that the polarizer 201 could comprise a single guidance element 201a.

Figure 2B:
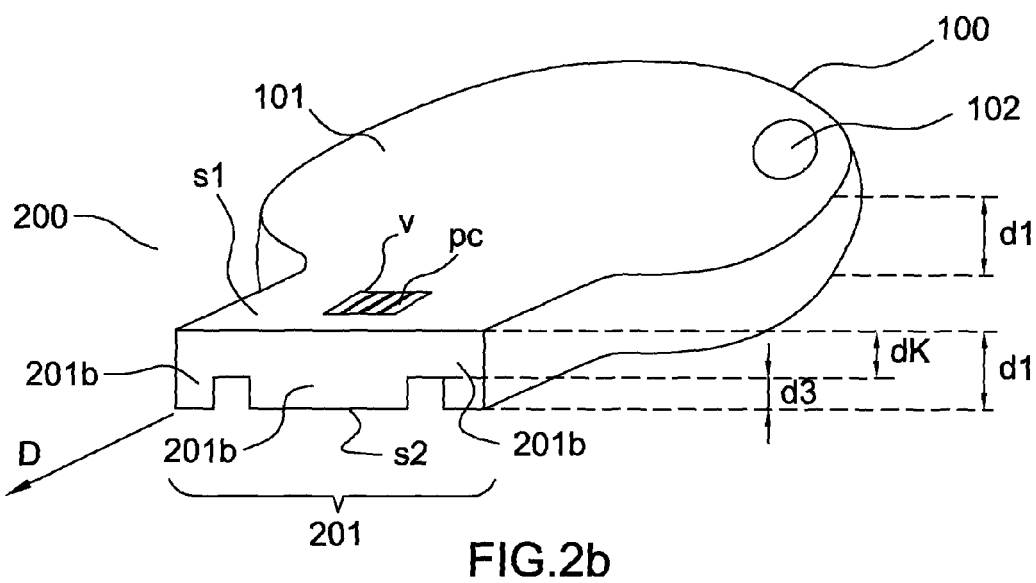

FIG. 2b represents another exemplary electronic key according to another implementation of the invention. In this example, the polarizer 201 is formed extending from the opposite surface s2 of the connector from the surface s1 bearing the vignette v.

Figure 3B:
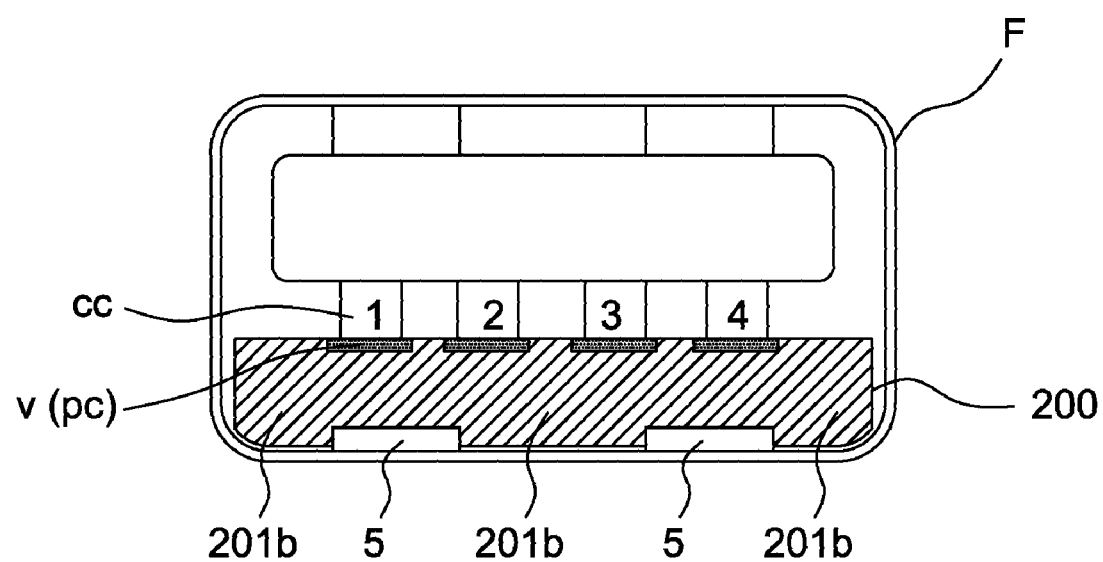

It comprises in the example three longeron-shaped or rib-shaped guidance elements 201b, whose positioning and dimensions correspond to the wider spaces of the female connector that are found under the counter-contacts cc, between the locking means 5, as illustrated in FIG. 3b. Two elements are thus arranged on each side of the connector parallel to the direction of introduction, and a third arranged in parallel and midway between the first two.

These guidance elements have a greater thickness than the standardized thickness $d_K$ of the connector: they are extending from the surface s2, by a height d3. Their dimensions are in practice determined as a function of the reciprocal configuration of the female connector, so as not to impede the insertion of the USB key connector in the permitted orientation, and conversely prevent the insertion in the opposite orientation. Preferably and as illustrated, the part 101 and the polarizer 201, have the same thickness d1, which is greater than the standardized thickness of the remainder of the connector $d_K$.

In a variant, the polarizer comprises only the two guidance elements 201b at the connector rim.

In a variant, the polarizer comprises a combination of the guidance elements 201a and 201b.

In a general manner, the guidance elements of a polarizer according to the invention are chosen with a width and a thickness which corresponds to the characteristics of the female connector. In the longitudinal direction D, they advantageously have a rib or longeron form, in continuity with the gripping part, thereby improving the mechanical aspects. They could take another form, for example a tag form. They ensure a guidance function for the correct direction of insertion, and an abutment function in the opposite direction, preventing insertion. They improve the rigidity and the mechanical strength of the key. They are preferably arranged square with the edge of the connector (of the key body) via which the connector is introduced into a female connector.

The connector thus essentially exhibits two thicknesses: a thickness d1 which is greater than the standardized thickness at the level of each guidance element of the polarizer, the remainder of the connector being at the standardized thickness $d_K$.

According to a refinement of the invention, the electronic key advantageously takes a form separable from a card body. The card body will typically be that of a chip card in the ISO format, but thicker, and thicker than the standardized thickness $d_K$ of the USB connector, thus making it possible to use chip card manufacturing lines and all the associated technologies to manufacture the key. The cost of manufacturing the key is thereby reduced.

Figure 4:
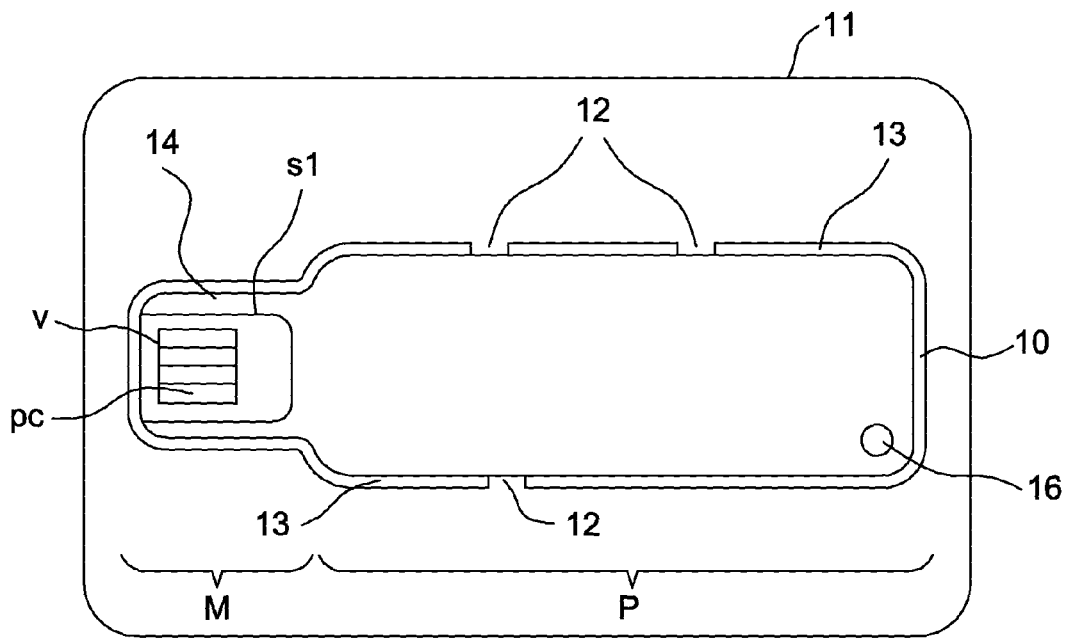
FIG. 4 schematically illustrates an electronic key in a form separable from a card body and obtained in accordance with a first embodiment of the invention.

FIG. 4 illustrates a first example of such an electronic key in the form separable from a card body 11.

It comprises an outline 10 of a key body, attached to a card body 11 by tabs 12. Hereinafter the reference 10 interchangeably designates either the outline or the key body. The key body comprises a part P for gripping and a connector M.

Figure 5:
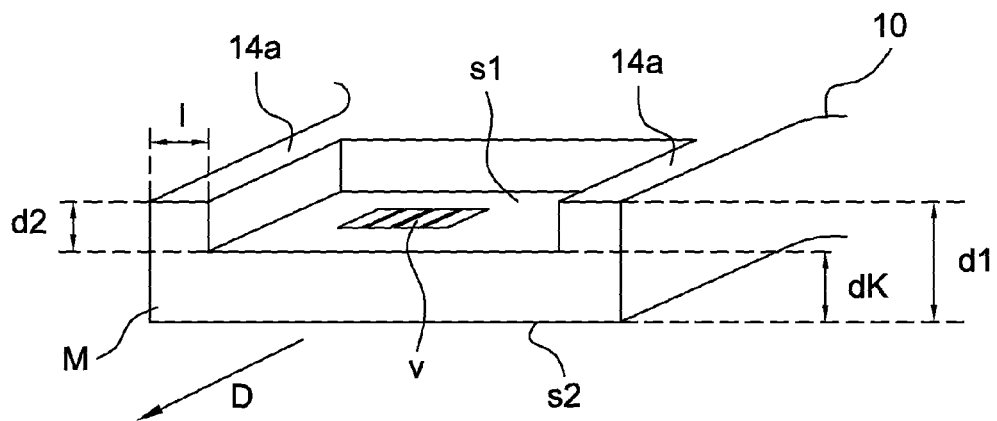
FIG. 5 illustrates an end-on view of the USB connector of this key.

The connector M comprises a vignette v of contact pads flush with the surface. This vignette is formed in a conventional manner on a printed circuit of a module which is inset into the key body, on the surface s1. It also comprises a polarizer 14, formed in one piece with the key body. In the example, and as illustrated in FIG. 5, it comprises two guidance elements 14a having a longeron or rib form parallel to a direction of introduction D of the connector. These elements are extending from the surface s1 bearing the vignette, one on each side of the vignette. Viewed end-on (FIG. 5), the connector M thus has substantially a U form.

The outline of the key body is made by any known cutting or machining technique, so as to make a slot 13 silhouetting the key body 10 and leaving only ties or tabs 12 which keep the key body attached to the card body. The key body can be detached from the card body by simple mechanical pressure, typically by simple pressure from the fingers, so as to break these tabs. These cutting techniques are well known and notably used to make the mini detachable cards in the SIM format.

In the example the tabs 12 are notched, that is to say their thickness has been reduced height-wise as illustrated in the transverse view of FIG. 4, so that they break easily. Other types of tabs can be used, such as those that will be seen by way of example with the second embodiment described next.

In the example, the cut 13 is complete around the connector M, which has the advantage of preventing plastic residues being brought by the breaking of a tab to this spot, which could impede electrical connection.

The card body 11 is manufactured on the basis of customary steps for manufacturing chip cards, used so as to ensure at one and the same time the mechanical rigidity and strength of the key. These steps comprise the making of a card body to the standardized ISO 7816 dimensions but thicker, and thicker than the standardized thickness of USB connectors. Preferably, this thickness is that of the key body excluding the connector, and of the polarizer, the remainder of the connector being at the standardized thickness $d_K$.

According to a first mode of manufacture of such an electronic key, the card body with the form of the connector with the polarizer standing, is obtained directly by plastic moulding, typically by thermoplastic moulding. The outline of the key body 10 through slots 13 and tabs 12 can be made through the moulding itself, or in a subsequent step, typically by milling: the electronic key illustrated in FIGS. 4 and 5 is obtained.

According to a second mode of manufacture, a card body 11 is firstly formed by assembling plastic sheets, by lamination and/or gluing, to achieve the desired thickness d1. The form of the connector with its polarizer is thereafter obtained by appropriately reducing the thickness of the body, typically by machining. The outline 10 of the key body can be made before or after this setting to thickness.

Detailed steps of this second mode of manufacture are more particularly illustrated by way of example in FIGS. 7 to 11.

Figure 7:
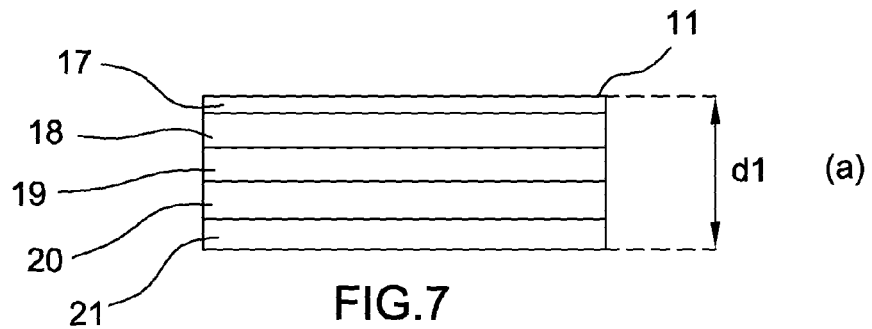
FIGS. 7 to 11 illustrate steps of a manufacturing method according to the invention.

FIG. 7 illustrates a step (a) of forming the card body 11 obtained by assembling plastic sheets, 17 to 21. At least the sheets 18 to 20 are laminated together. The two sheets 17 and 21 which form the recto and verso external faces of the card body are typically adhesive films or adhesives deposited on the sheets 18 and 20. The sheets of the assembly are chosen, to obtain the desired dimension d1 of the card body, at least about 2.5 millimetres, to obtain the minimum standing height of the guidance elements with respect to the surface plane (about 0.5 millimetres for d2): the choice typically pertains to the number of sheets and their respective thicknesses.

A machining of the key body is carried out thereafter, to obtain the standardized thickness $d_K$ in the zone 15 of the connector, polarizer excluded.

At this juncture it should be recalled that the vignette v generally takes the form of a module typically comprising a printed circuit on which the pads are made, this module being inset into the key body, at the level of the connector, so that the pads are flush with the surface. This well-known insetting technique, requires the formation of a cavity. Furthermore, and as represented in FIGS. 8 to 11, provision may be made to use a module 22 which comprises a microchip 23 at the back of the vignette v. The microchip is embedded in a resin drop 24, and the tags of the microchip are connected to the pads of the vignette by any known technique.

The machining of the connector illustrated in FIG. 4 will thus in practice comprise two steps: a step for forming the cavity so as to inset the module 22 previously prepared according to techniques well known in the field, and a step of setting the standardized thickness dk of the connector excluding polarizer which keeps the initial thickness of the key/card body.

It will be noted that the outline 10 of the key body can be made before or after machining the card body.

Figure 8:
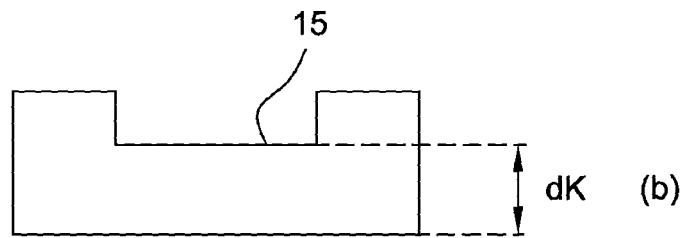
Figure 9:
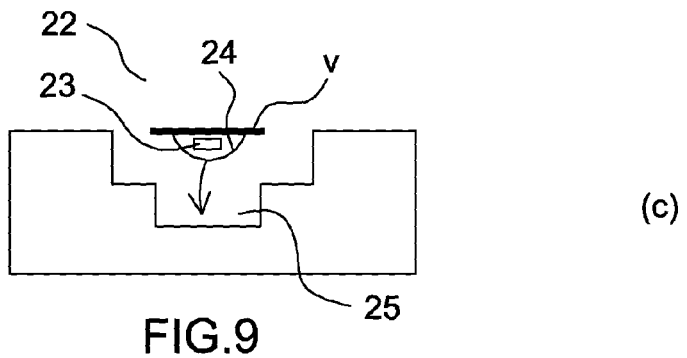

FIGS. 8 and 9 illustrate an implementation in which the zone 15 is firstly machined (step (b) FIG. 8) followed by a cavity 25 (step (c) FIG. 8) into which the module 22 is thereafter inset.

Figure 10:
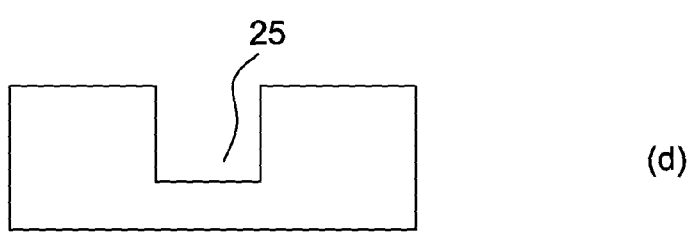
Figure 11:
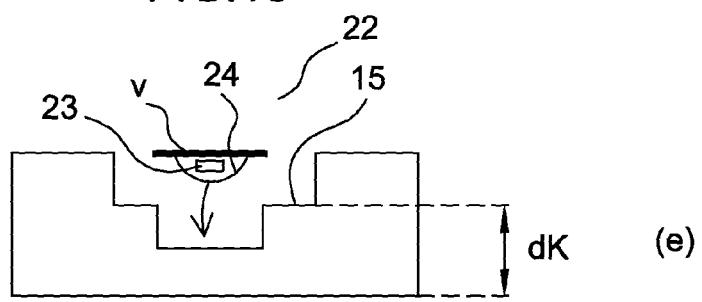

FIGS. 10 and 11 illustrate another implementation in which the cavity 25 is firstly machined (step (d) FIG. 10), followed by the zone 15 and the module 22 is inset into the cavity (step (e) FIG. 11).

Typically these various steps are in practice carried out on cards arising from large sheets previously laminated or cut.

When the card body 10 is made by moulding, a moulded card body will be obtained directly, the form of whose connector will correspond to that illustrated in FIG. 9 or 11: the module 22 can thereafter be inset.

The use of the steps for manufacturing chip cards makes it possible furthermore to customize a or the faces of the card body and or key body at lower cost, by using standard techniques for printing chip cards. Typically it is thus possible to print a pattern on each of the recto and verso faces of the card body 11 and/or of the key body 10. It is possible to make a common pattern for a batch of electronic keys, for example on the recto face, and a customized pattern on the verso face of each.

For example, when the card body is made by assembling sheets (FIG. 7), the printing may be carried out by silk-screen or offset printing of an opaque or transparent plastic sheet, which will advantageously be chosen with a thickness of less than or equal to substantially 0.8 millimetres, making it possible to use chip card printing machines. This printed plastic sheet will then be wrapped in the assembly step, by a surface transparent plastic protection sheet.

To make a pattern common to a batch of keys, for example a batch of 10000 keys, this pattern will be series-printed on a plastic sheet prior to the assembly step to make a corresponding set of keys, typically some fifty or so, and this operation will be repeated to produce the complete batch. By way of example, returning to FIG. 7, in which the card body is formed by assembling five sheets 17 to 21, it is possible to print patterns on the sheets 18 and 20, which will for example be 0.665 millimetre opaque PVC sheets, the sheets 17 and 21 being transparent plastic protection sheets, typically 0.08 millimetre PVC sheets. The central layer 19 will typically be a PVC sheet having a thickness chosen to achieve the thickness d1 of the body, for example, 1.010 millimetres, for a thickness d1 of about 2.5 millimetres.

Figure 12:
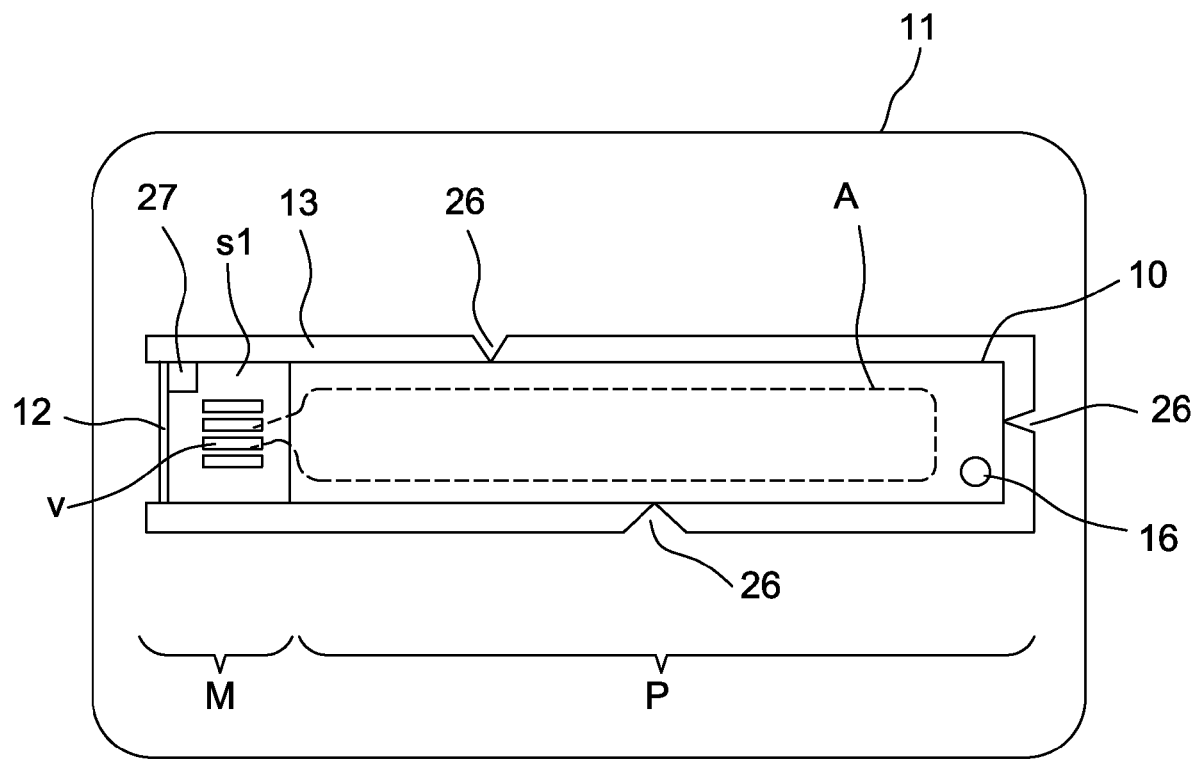
FIG. 12 schematically illustrates an electronic key in a form separable from a card body, according to another embodiment of the invention.
Figure 13:
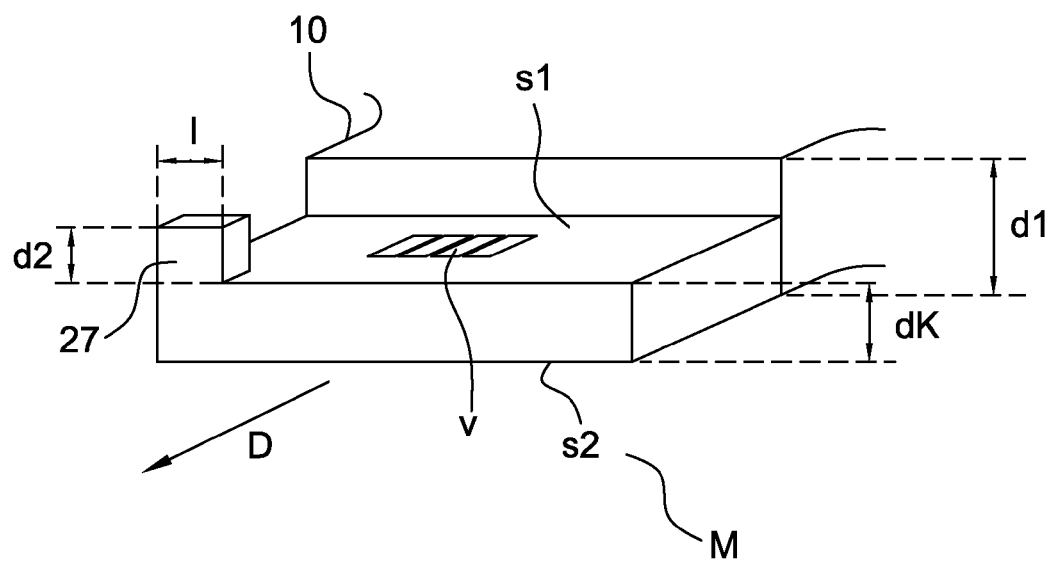
FIG. 13 illustrates an end-on view of the USB connector of this key.

FIGS. 12 and 13 illustrate respectively in an end-on sectional view of the connector and viewed from above another example of an electronic key in a form separable from a card body 11.

The key illustrated is different from that of FIG. 4, essentially as regards making the outline, in that it contains a metallic pattern of an antenna A in the volume of the key body, and in the form of the polarizer.

Figure 6:
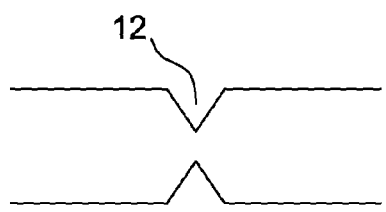
FIG. 6 is a transverse view of a notched tab fastening the key body to the card body.

When making the card outline 10 by cutting, tabs of various types are formed: notchless tabs 26; a notched tab 12 as illustrated in FIG. 6, along the rim of the connector M which is orthogonal to the direction of introduction of the key.

The antenna is made by any known technique so as to be embedded in the key body 11, essentially in the gripping part P.

By way of example, in the case where the card body 10 is made by assembling sheets as was previously described, this antenna A will typically be made by printing conducting ink or by etching metal or depositing copper wire on an opaque or transparent plastic sheet, for example on a 0.2 millimetre PVC sheet, before the assembly step. In the assembly step, this sheet is typically one of the central sheets, for example the sheet 19 in FIG. 7. The etching is carried out in such a way that the antenna is positioned in the volume of the key body whose outline 10 is made in a subsequent step.

In the advantageous case where the module bearing the vignette is of microcircuit type, with an integrated circuit microchip whose tags are connected to the USB contact pads, an electrical connection between the microchip and the antenna is effected, typically by connecting the tags of this microchip to this antenna A according to any known insetting technique, thus allowing contactless proximity communications.

The mechanical polarizer comprises a pillar-shaped guidance element 27, extending from the surface s1 bearing the vignette and on a side of the zone occupied by the vignette. Typically this guidance element is arranged at the connector rim and square with the edge of the connector via which it is introduced into a female connector. The form, illustrated more clearly in the view of FIG. 13, of the connector which ensues, can be obtained by moulding or machining, as described previously. In a variant, it is possible to make another guidance element, in the form of another pillar for example, on the other opposite side of the vignette.

The invention is not limited to the guidance element forms described by way of example. In a general manner the mechanical polarizer formed in one piece with the key body takes any form suited to the form of the female connector, to ensure a function of abutment in one direction, and of guidance in the other, with a form of the connector which ensues which can be obtained through a simple step of moulding, or machining the surface of the key body.

The invention which has just been described makes it possible to make a USB electronic key separate, or separable from a card body 11. In the latter case, this key can be easily separated from the card body, by breaking the tabs, notched and/or notchless, and can be attached for example to a keyring via a hole 16 provided in the key body for this purpose. The key and card bodies can advantageously be customized on each of the verso and recto faces. The key can only be introduced in the envisaged direction into any female connector, by virtue of the polarizer. It offers good mechanical strength and good rigidity. It can as an option comprise means (19, A) allowing communications of the contactless type, and notably communications of the proximity contactless type, in accordance with ISO standard 14443, or with so-called NFC (*Near Field Communication*) technology.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:
1. A method of manufacturing an electronic key furnished with a USB standardized connector having a mechanical polarizer, said method comprising the steps of:
   forming a key body which includes a functional portion and a manipulating portion;
   machining the functional portion in a thickness direction of the key body to form a recess and define a guidance element adjacent to the recess, wherein the guidance element forms the mechanical polarizer in the recess so that the functional portion with the mechanical polarizer and the manipulating portion are formed in one piece; and
   placing contact pads on a surface of the functional portion in the recess,
   wherein in said one piece of the mechanical polarizer of USB connector and the functional portion and the manipulating portion,
      said manipulating portion has a thickness greater than said functional portion,
      the guidance element protrudes from the surface of the functional portion or an opposite surface to the surface of the functional portion in the thickness direction, and has a height of substantially between 0.5 millimeters and 2.5 millimeters in relation to the surface,
      a width of the guidance element which is substantially equal to 0.5 millimeters, and
      the thickness of the manipulating portion is substantially between 2.5 millimeters and 4.5 millimeters, wherein said guidance element is in form of three logerons parallel to a direction of introduction of the connector.
2. The method according to claim 1, wherein the key body is formed by plastic sheets.
3. The method according to claim 1, further comprising
   forming a card body, and
   forming an outline of the key body on the card body, wherein the key body is attachable to the card body.
4. The method according to claim 1, forming the USB connector further comprises the step of assembling a plurality of plastic sheets to form said key body,
   wherein at least said one of plastic sheets is a printed plastic sheet with a thickness of less than or equal to 0.8 millimeters with a pattern common to a set of electronic keys to be made, which is printed in series on the plastic sheet.
5. The method according to claim 1, further comprising
   forming a module including the contact pads and at least one electronic microchip at a surface of the contact pads to which the electronic microchip is connected,
   forming a cavity at the recess of the functional portion, and
   fixing the module in the cavity, so that the contact pads are flush with the surface of the functional portion.
6. The method according to claim 1, wherein the thickness of the functional portion is a standardized thickness of the functional portion and is substantially 2 mm.
7. The method according to claim 1, wherein in said one piece of the mechanical polarizer of USB connector and the functional portion and the manipulating portion, a distance between the surface bearing the contact pads and the opposite surface to the surface bearing the contact pads in a thickness direction of the key body is the same as the thickness of the manipulating portion of the key body.
8. An electronic key, comprising:
   a male key body including a manipulating portion and a functional portion, said functional portion having a mechanical polarizer, wherein the functional portion with the mechanical polarizer and the manipulating portion are formed in one piece; and
   a female connector for receiving the male key body,
   wherein in said one piece of the mechanical polarizer and the functional portion and the manipulating portion,
      the functional portion has a standardized thickness and includes contact pads arranged on a surface of the functional portion,
      the mechanical polarizer comprises at least one guidance element protruding from the surface of the functional portion or an opposite surface to the surface of the functional portion,
      the manipulating portion has a thickness greater than said standardized thickness of said functional portion,
      upon insertion of the key body into the female connector, the functional portion is entirely covered by the female connector, and the guidance element face toward an inner surface of the female connector, wherein said guidance element is in form of three logerons parallel to a direction of introduction of the connector.
9. The electronic key according to claim 8, wherein
   a thickness of the guidance element extending from the surface bearing the contact pads is greater than that of the standardized thickness of the functional portion by a value of the order of 0.5 mm to 2.5 mm, and
   a width of the guidance element is of the order of 0.5 mm.
10. The electronic key according to claim 8, wherein the manipulating portion has a thickness of substantially between 2.5 millimeters and 4.5 millimeters.
11. The electronic key according to claim 8, wherein the polarizer has a thickness equal to the thickness of the manipulating portion.
12. The electronic key according to claim 8, further comprising a module includes the contact pads and at least one microchip at a surface of the contact pads to which the electronic microchip is connected, the module being placed in a cavity produced on the surface of the functional portion.
13. The electronic key according to claim 8, further comprising at least one printed face.
14. The electronic key according to claim 8, wherein the standardized thickness of the functional portion is substantially 2 mm.
15. The electronic key according to claim 8, wherein in said one piece of the mechanical polarizer and the functional portion and the manipulating portion, a distance between the surface of the functional portion and the opposite surface to the surface of the functional portion in a thickness direction of the key body is the same as the thickness of the manipulating portion of the key body.

* * * * *